3,301,819
POLYESTERS MODIFIED WITH α,ω-BIS-(4-SULFO-PHENOXY) ALKANOIC ACIDS AND ALKYL ESTERS THEREOF
Christian F. Horn, Stamford, Conn., and Harrison S. Kincaid, Nitro, W. Va., assignors to Union Carbide Corporation, a corporation of New York
No Drawing. Original application July 31, 1962, Ser. No. 213,589, now Patent No. 3,256,317, dated June 14, 1966. Divided and this application Aug. 24, 1965, Ser. No. 482,253
12 Claims. (Cl. 260—49)

This application is a divisional of Serial No. 213,589, filed July 31, 1962, entitled, "Bis(Phenoxy)Alkanoic Acid Compounds and Derivatives," now United States Patent No. 3,256,317.

This invention relates in part to the production of novel organic compounds, viz., bis(phenoxy)alkanoic acid compounds and derivatives thereof, including the ring substituted sulfo derivatives thereof, their alkali metal sulfonate salts, and the alkyl carboxylate esters thereof. The invention is also concerned with novel condensation polymers, i.e., polyesters containing, in polymerized form, minor amounts of the aforementioned bis(sulfophenoxy) alkanoic compounds. Such polymers, it has been found, evidence an improved affinity for dyestuffs. In addition, the invention is concerned with textile articles, i.e., fibers, filaments, yarns, etc., as well as to films and other structures produced from the aforementioned polymers, which also evidence an improved affinity for dyestuffs.

More particularly, the novel bis(sulfophenoxy)alkanoic acid compounds of this invention can be represented by the formula:

(I)

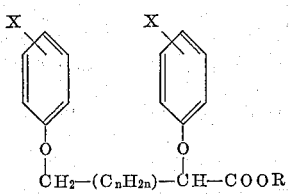

$$\mathrm{CH_2-(C_nH_{2n})-CH-COOR}$$

wherein X designates a sulfo (—SO$_3$H) or metallosulfo (—SO$_3$M) radical, M being an alkali metal atom, as for instance, a lithium, sodium, potassium, rubidium, or cesium atom, etc., and preferably an alkali metal atom having an atomic number of from 3 to 19, i.e., a lithium, sodium, or potassium atom; $n$ designates an integer having a value of from 0 to 5, and preferably from 0 to 3; and R designates a hydrogen atom or an alkyl radical containing from 1 to about 8 carbon atoms, such as a methyl, ethyl, propyl, butyl, hexyl, octyl, or 2-ethylhexyl radical, etc., of which the lower alkyl radicals containing from 1 to 4 carbon atoms are preferred.

As illustrative of the novel bis(sulfophenoxy)alkanoic acid compounds of this invention, there can be mentioned:

2,3-bis(2-sulfophenoxy)propanoic acid
2,3-bis(2-sodiumsulfophenoxy)propanoic acid
2,3-bis(4-sulfophenoxy)propanoic acid
2,3-bis(4-sodiumsulfophenoxy)propanoic acid
2,4-bis(4-sulfophenoxy)butanoic acid
2,4-bis(4-lithiumsulfophenoxy)butanoic acid
2,6-bis(4-sulfophenoxy)hexanoic acid
2,6-bis(4-potassiumsulfophenoxy)hexanoic acid
2,7-bis(4-sulfophenoxy)octanoic acid
2,7-bis(4-sodiumsulfophenoxy)octanoic acid
methyl 2,3-bis(2-sulfophenoxy)propanoate
methyl 2,3-bis(2-sodiumsulfophenoxy)propanoate
methyl 2,3-bis(4-sulfophenoxy)propanoate
methyl 2,3-bis(4-sodiumsulfophenoxy)propanoate
methyl 2,4-bis(4-sulfophenoxy)butanoate
methyl 2,4-bis(4-lithiumsulfophenoxy)butanoate
methyl 2,6-bis(4-sulfophenoxy)hexanoate
methyl 2,6-bis(4-potassiumsulfophenoxy)hexanoate
methyl 2,7-bis(4-sulfophenoxy)heptanoate
methyl 2,7-bis(4-sodiumsulfophenoxy)octanoate
butyl 2,3-bis(4-sulfophenoxy)propanoate
butyl 2,3-bis(4-lithiumsulfophenoxy)propanoate
octyl 2,3-bis(4-sulfophenoxy)propanoate
octyl 2,3-bis(4-potassiumsulfophenoxy)propanoate, and the like.

The bis(sulfophenoxy)alkanoic acid compounds can be obtained by various methods, which, it is to be noted, in no way limit the invention. Such compounds can, for instance, be obtained by steps which include the sulfonation of a member of a novel class of compounds, viz., the bis-(phenoxy)alkanoic acids and alkyl carboxylate esters thereof represented by the formula:

(II)

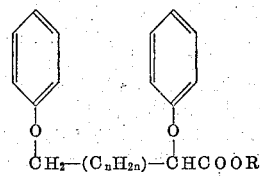

$$\mathrm{CH_2-(C_nH_{2n})-CHCOOR}$$

wherein $n$ and R are as defined above. Thus, it can be seen that the novel bis(phenoxy)alkanoic acid compounds contemplated by this invention can also be represented by Formula I above, wherein X designates hydrogen.

As typical of such compounds, hereinafter referred to for convenience as unsulfonated precursors, there can be mentioned:

2,3-bis(phenoxy)propanoic acid
2,4-bis(phenoxy)butanoic acid
2,6-bis(phenoxy)hexanoic acid
2,7-bis(phenoxy)heptanoate
methyl 2,3-bis(phenoxy)propanoate
methyl 2,4-bis(phenoxy)butanoate
methyl 2,6-bis(phenoxy)hexanoate
methyl 2,7-bis(phenoxy)heptanoate
butyl 2,3-bis(phenoxy)propanoate
octyl 2,3-bis(phenoxy)propanoate, and the like.

The unsulfonated precursors hereinabove described can themselves initially be obtained, for instance, by the reaction of an alkyl alpha, omega-dibromoalkanoate with sodium phenoxide in accordance with the equation:

(III)
$$\mathrm{Br}\phantom{xxxxx}\mathrm{Br}$$
$$\mathrm{CH_2-(C_nH_2)_n-CHCOOR + 2NaO} \bigcirc \longrightarrow$$

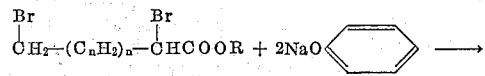

$$\mathrm{CH_2-(C_nH_{2n})-CHCOOR + 2NaBr}$$

wherein $n$ designates an integer and R an alkyl radical as defined above. The corresponding free carboxylic acid can subsequently be obtained, when desired, by conventional hydrolysis.

The alkyl alpha, omega-dibromoalkanoates employed as a starting material are well known to the art. The reaction thereof with sodium phenoxide, producing an alkyl bis(phenoxy)alkanoate, can be carried out, for instance, by first dissolving sodium metal in an inert solvent, such as absolute ethanol, etc., and adding thereto an equimolar amount of phenol with respect to the metal. The resulting sodium phenoxide is then heated to reflux and an alkyl alpha, omega-dibromoalkanoate, such as methyl 2,3-dibromopropanoate, etc., is slowly added to the refluxing solution. Upon continuing the reflux of the reaction mixture, the desired alkyl bis(phenoxy)alkanoate is formed in solution, and by-product sodium bromide precipitates out. The reaction is best continued until the formation of the sodium bromide precipitate is no longer noted. Thereafter, the precipitate and solvent are removed from the crude reaction product, preferably by filtration and distillation respectively. Finally, the residue can be purified in any convenient manner to yield the desired product. The alkyl bis(phenoxy)alkanoate can also be produced by numerous variations of the foregoing procedure as can readily be determined by one skilled in the art in light of this disclosure.

The conversion of the unsulfonated precursors to the corresponding sulfonic acid derivatives, represented above by Formula I, wherein X designates the sulfo radical, can be carried out by known sulfonation procedures. Thus, for example, the unsulfonated precursor can be sulfonated by reaction with a mild sulfonating agent comprised of a mixture of sulfuric acid and acetic anhydride, at a temperature of from about −15° C. to about 50° C., and preferably from about 0° C. to about 25° C. The unsulfonated precursor can be introduced to the sulfonating agent alone, or if desired in solution, using, by way of illustration, an inert solvent, such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the unsulfonated precursor can vary from about 2 to about 10 moles of sulfuric acid per mole of the unsulfonated precursor, with a ratio of from about 2 to about 3 moles of sulfuric acid per mole of the unsulfonated precursor being preferred.

Produced as hereinabove described, the sulfonated derivative can be recovered, if desired, in any convenient manner, such as by crystallization and filtration, etc. Moreover, while the sulfonated product obtained in this manner is predominantly the bis(4-sulfophenoxy) derivative, other sulfo derivatives may also be formed or can be obtained by varying the sulfonation reaction in a manner determinable by those skilled in the art in light of this disclosure.

When the starting material used in the sulfonation is the free acid, that is when R of Formula II is hydrogen, the sulfonated derivative is readily converted to the corresponding alkyl carboxylate ester by esterification in conventional manner with an alkyl alcohol containing from 1 to about 8, preferably from 1 to about 4 carbon atoms, such as those hereinabove described. The presence of the sulfo radicals during the esterification serves to catalyze the reaction (autocatalysis), thus obviating the conventional addition of an esterification catalyst. Conversely, when the starting material used in the sulfonation is an alkyl carboxylate ester, the corresponding free carboxylic acid can subsequently be obtained, if desired, by conventional hydrolysis.

The sulfonated derivative can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 80° C.

The mole ratio of alkali metal hydroxide, alkoxide, or salt to the sulfonated derivative can vary from about 2 to about 10 moles of the alkali metal-containing compound per mole of the sulfonated derivative, with a ratio of from about 2 to about 3 moles of the alkali metal-containing compound per mole of the sulfonated derivative being preferred. Moreover, when the sulfonated derivative undergoing reaction is an alkyl carboxylate ester, the conversion of the product to the alkali metal sulfonate derivative can be effected conveniently by titration with an alkali metal hydroxide or alkoxide, preferably in alcoholic solution, to a pH of 7 to 9.

The alkali metal sulfonate thus produced can subsequently be recovered in any convenient manner, such as by filtration, or as the residue product obtained upon evaporation of any solvent present, etc.

The novel bis(phenoxy)alkanoic acid compounds of this invention find use in a wide variety of applications. Such compounds can be used, for instance, as intermediates in the production of dyestuffs, pharmaceuticals, and ion exchange resins. In particular, the bis(sulfophenoxy) alkanoic acid compounds represented by Formula I are eminently suited for use as modifiers in the production of high-melting, crystalline, linear polyesters, especially polyesters formed by the polycondensation reaction of terephthalic acid, or ester-forming derivative thereof, with an aliphatic glycol, or ester-forming derivative thereof, and in connection with such use are hereinafter referred to for convenience as the modifiers of this invention. The modified polyesters prepared in part from the modifiers of this invention, and preferably from the alkali metal sulfonate derivatives, i.e., by the incorporation of such compounds in otherwise conventional polycondensation reaction mixtures, can, in turn, be employed to produce fibers which are readily dyeable with cationic and disperse dyestuffs by standard dyeing procedures. The dyed fibers thus obtained possess shades having good wash fastness and heat and light fastness, as well as stability to conventional dry cleaning procedures. The modified polyesters prepared in part from the modifiers of this invention can also be used to produce films and molded articles evidencing improved dyeability.

Synthetic linear polyesters are well known to the art and are readily prepared, for example, by the reaction of dibasic carboxylic acids, or their ester-forming derivatives, with dihydric alcohols, or their functional derivatives. The high-molecular weight linear polyester thus obtained finds frequent use in the production of textile articles, films, and the like. Of particular interest in this regard are the polyesters of terephthalic acid and its esters with aliphatic glycols, such as polyethylene terephthalate, and the polyester from dimethyl terephthalate and 1,4-cyclohexanedimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improve the dyeability of a film- and filament-forming material having as many desirable characteristics as those possessed by polyethylene terephthalate. Such efforts have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as chlorobenzenes, chlorophenols, and the like, for the dyeing process. Still another proposal involved the application of vat or acetate dyes under superatmospheric pressure at temperatures above 100° C. A further proposal involved the use of pigments that are mixed directly with the polyethylene terephthalate melt before spinning.

It is apparent that these efforts have at best had very limited success. The methods involved chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially attractive.

These difficulties have now been overcome without impairing the characteristics of the polyester. Thus, for example, modified polyethylene terephthalate fibers and films made in accordance with this invention are readily dyeable by ordinary dyeing techniques, while at the same time retaining excellent heat and light stability, dimensional stability and other desirable physical properties.

The dyeable linear polyesters of this invention are prepared essentially from an aromatic dicarboxylic acid or ester-forming derivative thereof, with a diol, such as an acyclic or alicyclic aliphatic glycol, an aliphatic-aromatic diol, an aromatic diol, or a diester thereof, and a small amount of at least one modifier of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$ wherein m is an integer of from 2 to 10, such as ethylene glycol, trimethylene glycol, pentamethylene glycol, hexamethylene glycol, decamethylene glycol, and the like. Other suitable aliphatic glycols include 1,4-cyclohexanedimethanol and the like. Still other suitable diols include aliphatic-aromatic diols such as 4-hydroxybenzyl alcohol, aromatic diols such as hydroquinone, etc. Mixtures of two or more diols can also be employed, with up to about 10 mole percent or slightly more of any one diol being replaced by a different diol.

Particularly suitable aromatic dicarboxylic compounds for use in preparing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids or esters include:

isophthalic acid,
p,p'-diphenylcarboxylic acid,
p,p'-dicarboxydiphenyl ethane,
p,p'-dicarboxydiphenyl hexane,
p,p'-dicarboxydiphenyl sulfide,
p,p'-dicarboxydiphenyl sulfone,
p,p'-dicarboxydiphenyl ether,
p,p'-dicarboxyphenoxy ethane, 2,6-naphthalene dicarboxylic acid; their alkyl esters; and the like.

Mixtures of two or more dicarboxylic acids or esters can also be used, with up to about 10 mole percent or slightly more of any one aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl eicosane dioate, and the like.

Dyeable linear polyesters can also be prepared by the self-condensation of a hydroxycarboxylic acid or ester together with a modifier of this invention, or by the partial replacement of a diol or aromatic dicarboxylic acid or ester with a hydroxycarboxylic acid or ester within the limits hereinabove described. In addition, dyeable linear polyesters can also be prepared by blending conventional, i.e., unmodified, polyesters with a polyester prepared by the condensation of a modifier of this invention with a diol, particularly an aliphatic glycol.

In preparing a dyeable linear polyester of this invention, at least about a 1.3 to 1 molar ratio of diol to dicarboxylic acid or ester is used. However, an excess of diol to the dicarboxylic compound ranging from about 2 to 10 moles of diol per mole of the dicarboxylic compound can also be used. A more satisfactory ratio is from about 1.3 to about 7 moles of diol per mole of the dicarboxylic compound, with a ratio of from about 1.5 to about 5 moles of diol per mole of the dicarboxylic compound being especially preferred.

The amount in which the modifier of this invention is employed in preparing the dyeable linear polyester can be varied from about 0.1 to about 3.5 mole percent of the modifier based upon the total amount of dicarboxylic compound charged, ergo incorporated in the polyester, since an excess of diol is at all times employed in the reaction. A preferred ratio is from about 0.15 to about 2.5 mole percent of the modifier based upon the total amount of dicarboxylic compounds present. While somewhat greater amounts of the modifier can also be employed, the use of a proportion greater than about 4 mole percent of one or more of the modifiers based upon the total amount of dicarboxylic compounds charged may have an undesirable effect upon the molecular weight of the polyester product.

Moreover, in the formation of a dyeable linear polyester by the reaction of any one given dicarboxylic acid or ester with any one given diol, especially good results, measurable in terms of improved dyeability, can be obtained in accordance with this invention when from about 1 to about 10 mole percent of either the dicarboxylic compound or the diol is replaced by one or more different comonomers of similar difunctionality. The comonomer can be any of the dicarboxylic acids or esters, diols or hydroxycarboxylic acids or esters hereinabove described, other than the difunctional monomers conventionally employed in producing a given polyester, as indicated above. The presence of the comonomer, it is believed, disrupts the crystallinity of the polyester product to a limited extent, thereby making the dye-attractive metallosulfo radicals of the modifier of this invention more accessible to dye molecules during subsequent dyeing operations. Higher proportions of comonomer within the ranges hereinabove described can also be employed, although such use is generally attended by little additional advantage insofar as improved dyeability is concerned. Moreover, as is known to the art, the comonomer can, by appropriate selection, also serve as a dye-assistant, thereby further enhancing the dyeability of the linear polyesters of this invention.

In preparing a dyeable linear polyester of this invention, the prescribed amounts of diol, dicarboxylic compounds, including the modifier of this invention, and catalyst, when desired, are charged to a reactor. When a dicarboxylic acid or ester is employed as a reactant, the reaction mixture is heated at a temperature of from about 150° C. to about 270° C., and preferably from about 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess diol is removed by heating the reaction mixture to a temperature of up to about 300° C., under reduced pressure in an inert atmosphere, or by passing a stream of an inert gas through the reaction mixture at atmospheric pressure. A polycondensation is then carried out by heating the reaction mixture at a temperature of from about 225° C. to about 325° C., and preferably from about 250° C. to about 290° C., under a reduced pressure of from about 0.1 millimeter to about 5 millimeters of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known to the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, magnesium methoxide, sodium methoxide, barium oxide, cadmium formate, litharge, dibutyltin oxide, tetraisopropyl titanate, calcium titanium silicate, and the like. Other conventional catalysts can also be employed. The concentration of the catalyst can be varied from about 0.001 to about 1 percent by weight, based upon the total amount of dicarboxylic compounds charged. A preferred amout is from about 0.005 to about 0.5 percent by weight of catalyst, and more preferably from about 0.01 to about 0.2 percent by weight of catalyst, based upon the total amount of dicarboxylic compounds charged. Other materials can also be included in the reaction mixture, as for example, color inhibitors such as alkyl or aryl phosphites; pigments, delusterants or other additives, such as titanium dioxide or barium carbonate; or viscosity stabilizers, etc.

A typical procedure for producing the polyesters is described, for example, in U.S. Patent 2,465,319, although this procedure can be varied by one skilled in the art in light of this disclosure.

In view of the disadvantages encountered when many modifiers are incorporated in polyesters, as hereinabove described, it was unexpected that the modifiers of this invention would be sufficiently stable, both chemically and thermally, to withstand the polycondensation conditions in the presence of the other reactants, as well as the high temperatures necessary for spinning the polyesters. It was also surprising that the fibers produced from modified polyesters of this invention showed no significant differences in physical properties from the unmodified polyester fibers, and that they exhibited greatly enhanced dyeability, as well as many other desirable textile properties. By way of illustration, such fibers are also often desirably delustered or "whitened," and upon dyeing with basic or disperse dyestuffs by standard procedures, possess medium to deep shades of color having good wash fastness and light fastness with selected dyes, as well as stability to conventional dry-cleaning operations. Fabrics produced from the fibers are also characterized by a desirable "hand," and "wash-and-wear"-type properties.

At the same time, the modifiers of this invention advantageously also serve as chain-terminators in the polycondensation reaction producing the polyesters, thereby affording effective and convenient control over the molecular weight of the polyester products, while simultaneously improving the dyeability of the polyester. The modifiers are, in fact, particularly well suited for use as molecular weight regulators in a continuous polycondensation process due to their extremely low volatility. Thus, the compounds are not readily removed from the reaction mixture by either vacuum or contact with inert gas which may be passed through the reaction mixture during the polycondensation. Moreover, since the modifiers occur in the resulting polyesters only at the end of linear chains, due to their monofunctional structure, they do not materially affect the desirable physical properties of the polyesters. Hence, the proportion in which the modifiers are employed or incorporated in accordance with this invention to prepare polyesters having improved dyeability is ordinarily much less than that in which difunctional dye-assistants, which interrupt the polymer chain, are conventionally employed.

The specific examples which follow serve as further illustration of the present invention. In the examples, the reduced viscosity ($I_R$) of the dyeable linear polyesters of this invention is determined by dividing the specific viscosity of a solution of the polyester by the concentration of the polyester in the solution. The specific viscosity is determined by dividing the difference between the viscosity of the polyester solution and the viscosity of the solvent by the viscosity of the solvent. In particular, the reduced viscosity of the polyesters is calculated from the equation:

$$(IX) \qquad I_R = \frac{\Delta N}{N_o} \times \frac{1}{C}$$

wherein $\Delta N$ is the difference between the flow time of the polyester solution and the flow time of solvent, $N_o$ is the flow time of the solvent, and $C$ is the concentration of the polyester in grams per 100 milliliters of solution. The reduced viscosities are obtained at a polyester concentration of 0.2 gram per 100 milliliters of solution, using a 3:2 mixture of phenol and tetrachloroethane as the solvent. The reduced viscosity of the polyesters can vary from about 0.2 to about 2, with values from about 0.35 to about 1 being preferred.

The dyeable linear polyesters of this invention can be melt-spun to form filaments and yarns. In a typical operation, before melt-spinning, the polyesters are dried overnight at a temperature of 90° C. under a reduced pressure of 2 mm. of mercury, and then melt-extruded in a plunger-type spinning machine at a temperature of from 270 C. to 295 C., using a spinnerette having 30 holes, each 0.015 inch in diameter. The orifice velocity is 3 feet per minute and the yarn is taken up at 150 feet per minute, a draw ratio of 50:1. The yarn is hot-stretched at a temperature of 90° C. around an electrically heated pin to an extent of from 200 to 500 percent, and then continuously annealed at a temperature of 150° C. over an electrically heated bar, allowing 10 percent relaxation. The yarn is thereafter woven into fabrics and dyed. The spinning procedure is conventional for polyesters, and is well known to the art.

The fabrics are dyed by standard procedures both in the absence of, and using dye-carriers. The dye baths have liquor-to-fiber bath ratio of 40:1 and, based upon the weight of the fabric to be dyed, contain 1 percent by weight of nonyl phenyl polyethylene glycol ether in the case of a basic dyebath, and 1 percent by weight of sodium N-methyl-N-oleoyltaurate in the case of a disperse dyebath. The dye concentration is 3 percent by weight based upon the weight of the fabric.

In a typical dyeing procedure, the various components of the dyebath are admixed and made up to volume with distilled water. The dyestuff is introduced as a paste in 0.25 percent by weight of acetic acid, based upon the weight of the fabric to be dyed. The fabric is scoured in a commercially available washer and dried in a commercially available drier. About 5 to 10 grams of the fabric is added to the dyebath, and the temperature of the bath is raised to the boil over a period of 15 minutes, and held at the boil for an additional period of 90 minutes. The dyed fabric is then rinsed in warm water and scoured in an aqueous solution containing 1 percent by weight of a commercially available alkyl phenyl polyethylene glycol ether surfactant and 0.25 percent by weight of soda ash, based upon the weight of the fabric, at a temperature of 60° C. for a period of 15 minutes. The dyed and scoured fabric is finally rinsed in water and air dried.

Among the basic and disperse dyestuffs which readily dye the fibers produced from the polyesters of this invention, one can mention the "Genacryl" dyes discussed on pages 432 to 433 of the American Dyestuff Reporter, volume 43, 1954, for example, Genacryl Red 6B (Basic Violet 7, Color Index No. 48020); Genacryl Pink G (Basic Blue 1, Color Index No. 42025); Celliton Fast Red GGA Ex. Conc. (Disperse Red 17, Color Index No. 11210); Fuchsine SPC (Basic Red 9, Color Index No. 42500); Fuchsine Conc. (Basic Violet 14, Color Index No. 42510); Methyl Violet 2B (Basic Violet 1, Color Index No. 42535); Methylene Blue SP (Basic Blue 9, Color Index No. 52015); Victoria Green (Basic Green 4, Color Index No. 4200); Rhodiamine B (Basic Violet 10, Color Index No. 45170); Sevron Yellow R (Basic Yellow 11, Color Index No. 48055); Celliton Fast Pink BA (Disperse Red 15, Color Index No. 60710); Latyl Blue FL; Maxilon Red BL; Sevron Brilliant Red 4G (Basic Red 14); Sevron Blue 5G (Basic Blue, Color Index 51004); and the like.

*Example I*

Sodium metal, weighing 36.8 grams, was dissolved at room temperature in 750 milliliters of absolute ethanol, contained in a 2-liter flask equipped with a mechanical stirrer, thermometer, condenser, and dropping funnel. A solution of 150 grams of phenol dissolved in 250 milliliters of absolute ethanol was added dropwise to the flask, accompanied by agitation, at room temperature. The pH of the resulting reaction mixture was 11.7. The reaction mixture was heated to reflux and 230 grams of methyl 2,6-dibromohexanoate was added dropwise to the flask. The reaction mixture was then heated at reflux for a period of 14 hours, during which time a sodium bromide precipitate formed and the pH dropped to 7.0. Upon cooling the crude reaction product to room temperature, the precipitated sodium bromide was removed by filtration. Thereafter, ethanol was removed under reduced pressure, the residue product was dissolved in anhydrous ethyl ether, and the solution filtered to remove any sodium bromide that was still present and dissolved in the ethanol. The solution was finally distilled on a goose neck still. In this manner, 186 grams of methyl 2,6-bis(phenoxy) hexanoate were obtained at a boiling point in the range of 210–213° C. under a reduced pressure of 2 millimeters of mercury.

*Analysis.*—Calculated for $C_{19}H_{22}O_4$: C, 72.58; H, 7.06. Found: C, 72.11; H, 7.48.

In a similar manner, methyl 2,3-di(phenoxy)propanoate is obtained by the substitution of an equimolar amount of methyl 2,3-dibromopropanoate for the corresponding hexanoate in this example.

*Example II*

Sulfuric acid (95.5%), weighing 30 grams, was added dropwise to 66 grams of acetic anhydride contained in a 1-liter, 4-necked flask equipped with a mechanical stirrer, thermometer, condenser and dropping funnel, accompanied by agitation, at a temperature in the range of −10° C. to 0° C. To this solution, 44 grams of methyl 2,6-diphenoxyhexanoate were added dropwise at a temperature maintained in the range of −5° C. to 0° C. After the addition of the ester was completed, agitation of the reaction mixture was continued for a period of 4 hours at a temperature in the range of 0° C. to 5° C. The reaction mixture was then allowed to warm to room temperature, and 500 milliliters of anhydrous methanol were added thereto at a temperature in the range of 25° C. to 30° C. Thereafter, the reaction mixture was heated at reflux for a period of 4 hours to insure the complete transformation of the acetic anhydride and acetic acid present to methyl acetate, and subsequently transferred to an evaporating dish, permitting the solvent present to evaporate therefrom overnight. The residue was dissolved in 500 milliliters of anhydrous methanol, transferred to a reaction flask, and a constant boiling mixture of methyl acetate and methanol was distilled off while adding fresh methanol at a rate equal to the rate of distillation until a constant boiling point of 64.5° C., i.e., the boiling point of methanol, was reached. The solution was then cooled to room temperature and titrated with methanolic sodium hydroxide to a pH of 9.0, whereupon methyl 2,6-bis(4-sodiumsulfophenoxy)hexanoate was formed as a precipitate. Finally, the precipitated product was filtered, dried in a vacuum oven at a temperature of 110° C. under a reduced pressure of 29 milliliters of mercury, and purified by extraction with methanol.

*Analysis.*—Calculated for $C_{19}H_{20}O_{10}S_2Na_2$: C, 44.01; H, 3.89. Found: C, 43.77; H, 3.83.

In similar manner, methyl 2,3-bis(4-potassiumsulfophenoxy)-propanoate is obtained by the substitution of equimolar amounts of methyl 2,3-bis(phenoxy)propanoate and potassium hydroxide for methyl 2,6-bis(phenoxy)-hexanoate and sodium hydroxide, respectively, in this example.

*Example III*

A mixture of 175 grams of dimethyl terephthalate, 7.1 grams of methyl 2,6-bis(4-sodiumsulfophenoxy)hexanoate, 140 grams of ethylene glycol, 0.073 grams of zinc acetate, and 0.027 gram of antimony oxide was charged to a reactor and heated at a temperature in the range of 197° C. to 211° C. for a period of 3 hours to bring about an ester exchange, while distilling off the methanol formed during the reaction. The reaction mixture was then heated at a temperature in the range of 211° C. to 233° C. for a period of 1 hour to remove the glycol excess. Thereafter, the temperature of the reaction mixture was maintained in the range of 260° C. to 272° C. for a period of 5.25 hours to carry out a polycondensation. During the reaction, a vigorous stream of nitrogen was passed through the reaction mixture at atmospheric pressure. A white, crystalline polyester was thus obtained, having a reduced viscosity of 0.70 and a melting point in the range of 260° C. to 262° C. Fibers melt-spun from this polyester exhibited a cold-draw of 300 percent and were tough and pliable. A knitted fabric prepared from the polyester was dyed to a pastel shade with Sevron Blue 5G Ex. Conc. without the use of a carrier. In similar manner a dyeable fiber-forming polyester is obtained by the substitution of methyl 2,3-bis(4-potassiumsulfophenoxy)propanoate as the modifier of this invention.

*Example IV*

A mixture of 100 grams of dimethyl terephthalate, 7.67 grams of dimethyl sebacate, 5.2 grams of methyl 2,6-bis(4-sodiumsulfophenoxy)hexanoate, 86 grams of ethylene glycol 0.05 gram of zinc acetate and 0.017 gram of antimony oxide was charged to a reactor and heated at a temperature in the range of 212° C. to 217° C. for a period of 3.75 hours to bring about an ester exchange, while distilling off the methanol formed during the reaction. The reaction mixture was then heated at a temperature in the range of 215° C. to 265° C. for a period of 1.25 hours to remove the glycol excess. Thereafter, the temperature of the reaction mixture was maintained in the range of 274° C. to 278° C. for a period of 5 hours to carry out a polycondensation. During the reaction, a vigorous stream of nitrogen was passed through the reaction mixture at atmospheric pressure. A white, crystalline polyester was thus obtained, having a reduced viscosity of 0.98 and a melting point in the range of 250° C. to 251° C. Fibers melt-spun from this polyester were dyed to a pastel shade with Sevron Blue 5G and to a deep shade with Celliton Fast Red GGA Ex. Conc. without the use of a carrier. By way of comparison, fibers melt-spun from an unmodified polyethylene terephthalate polyester were not dyed by Sevron Blue 5G and were dyed to only a very light shade with Celliton Fast Red GGA Ex. Conc.

What is claimed is:
1. The dyeable linear polyester consisting essentially of the condensation product o (a) a dicarboxylic compound selected from the group consisting of the monocyclic aromatic dicarboxylic acids and the dialkyl esters thereof;

(b) an aliphatic glycol containing from 2 to 10 carbon atoms; and, based upon the total amount of said dicarboxylic compound; (c) from about 0.1 to about 3.5 mole percent of a compound of the formula:

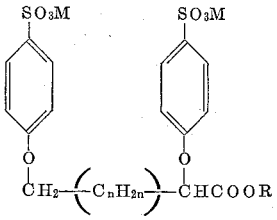

wherein M is an alkali metal, $n$ is a value of from 0 to 5, and R is selected from the group consisting of hydrogen and alkyl of from 1 to 8 carbon atoms.

2. The dyeable linear polyester consisting essentially of the condensation product of (a) dimethyl terephthalate; (b) a compound of the formula:

wherein $m$ is an integer of from 2 to 10; and, based upon the total amount of said dimethyl terephthalate, (c) from about 0.1 to about 3.5 mole percent of a compound of the formula:

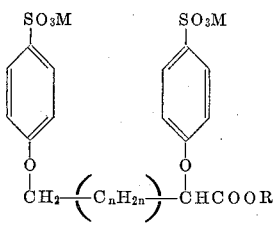

wherein M is an alkali metal having an atomic number of from 3 to 19, $n$ is a value of from 0 to 3, and R is methyl.

3. The dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

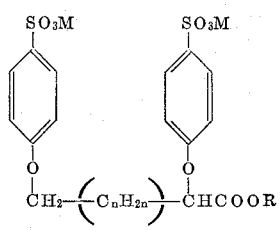

wherein M is an alkali metal having an atomic number of from 3 to 19, $n$ is a value of from 0 to 3, and R is methyl.

4. The dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2,3-bis(4-potassiumsulfophenoxy)propanoate.

5. The dyeable linear polyester consisting essentially of the condensation product of (a) dimethyl terephthalate; (b) ethylene glycol; and, based upon the total amount of said dimethyl terephthaalte, (c) from about 0.15 to about 2.5 mole percent of methyl 2,6-bis(4-sodiumsulophenoxy)hexanoate.

6. A dyeable linear polyester consisting essentially of (a) a mixture of dicarboxylic compounds consisting of from about 90 to about 99.9 mole percent of dimethyl terephthalate and from about 0.1 to about 10 mole percent of dimethyl sebacate; (b) ethylene glycol; and, based upon the total amount of said mixture of dicarboxylic compounds, (c) from about 0.15 to about 2.5 mole percent of methyl 2,6-bis(4-sodiumsulphopenoxy)hexanoate.

7. The stretched, dyeable textile article composed of a dyeable linear polyester consisting essentially of the condensation product of (a) a dicarboxylic compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic compound, (c) from about 0.1 to about 3.5 mole percent of a compound of the formula:

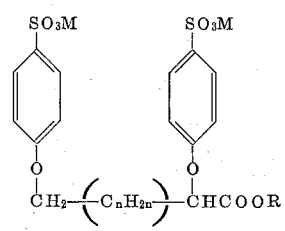

wherein M is an alkali metal, $n$ is a value of from 0 to 5, and R is selected from the group consisting of hydrogen and alkyl of from 1 to 8 carbon atoms.

8. The stretched, dyeable textile article composed of a dyeable linear polyester consisting essentially of the condensation product of (a) dimethyl terephthalate; (b) a compound of the formula:

wherein $m$ is an integer of from 2 to 10; and, based upon the total amount of said dimethyl terephthalate, (c) from about 0.1 to about 3.5 mole percent of a compound of the formula:

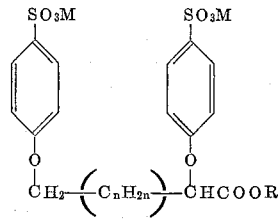

wherein M is an alkali metal having an atomic number of from 3 to 19, $n$ is a value of from 0 to 3, and R is methyl.

9. The stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.1 to about 3.5 mole percent of a compound of the formula:

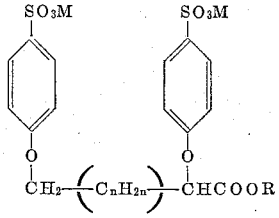

wherein M is an alkali metal having an atomic number of from 3 to 9, $n$ is a value of from 0 to 3, and R is methyl.

10. The stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 2.5 mole percent of methyl 2,3-bis(4-potassiumsulfophenoxy)propanoate.

11. The stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 3.5 mole percent of methyl 2,6-bis(4-sodiumsulphophennoxy) hexanoate.

12. The stretched, dyeable textile article composed of a dyeable linear polyester consisting essentially of the condensation product of (a) a mixture of dicarboxylic compounds consisting of from about 90 to about 99.9 mole percent of dimethyl terephthalate and from about 0.1 to about 10 mole percent of dimethyl sebacate; (b) ethylene glycol; and, based upon the total amount of said mixture of dicarboxylic compounds, (c) from about 0.15 to about 2.5 mole percent of methyl 2,6-bis(4-sodiumsulfophenoxy)hexanoate.

References Cited by the Examiner

UNITED STATES PATENTS

| | | | |
|---|---|---|---|
| 3,018,272 | 1/1962 | Griffing et al. | 260—75 |
| 3,049,512 | 8/1962 | Fournet et al. | 260—49 |
| 3,053,806 | 9/1962 | La Combe et al. | 260—49 |
| 3,077,493 | 2/1963 | Horn | 260—470 |
| 3,116,321 | 12/1963 | Horn et al. | 260—470 |

OTHER REFERENCES

Wadislaw, J.: Organic Chemistry, vol. 26, 711–713 (1961).

SAMUEL H. BLECH, *Primary Examiner.*

LOUISE P. QUAST, *Examiner.*